United States Patent
Budiman et al.

(10) Patent No.: US 8,999,881 B2
(45) Date of Patent: Apr. 7, 2015

(54) CU/ZN/AL CATALYST AND METHOD FOR PREPARING THE SAME

(71) Applicant: Korea Institute of Science and Technology, Seoul (KR)

(72) Inventors: Adeline Budiman, Seoul (KR); Jeong-Myeong Ha, Seoul (KR); Jae Wook Choi, Incheon (KR); Young Hyun Yoon, Seoul (KR); Sung Min Kim, Seoul (KR); Gi Seok Yang, Seoul (KR); Dong Jin Suh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/068,635

(22) Filed: Oct. 31, 2013

(65) Prior Publication Data

US 2014/0135210 A1 May 15, 2014

(30) Foreign Application Priority Data

Nov. 9, 2012 (KR) .......................... 10-2012-0126757

(51) Int. Cl.
*B01J 23/72* (2006.01)
*B01J 23/80* (2006.01)
*B01J 37/03* (2006.01)
*B01J 35/00* (2006.01)
*C01B 3/32* (2006.01)
*B01J 37/06* (2006.01)
*B01J 37/08* (2006.01)

(52) U.S. Cl.
CPC ................. *B01J 23/80* (2013.01); *B01J 37/031* (2013.01); *B01J 37/06* (2013.01); *B01J 37/08* (2013.01); *B01J 35/0053* (2013.01); *C01B 3/326* (2013.01); *C01B 2203/0227* (2013.01); *C01B 2203/1076* (2013.01); *C01B 2203/1223* (2013.01)

(58) Field of Classification Search
CPC .................................. B01J 23/72; B01J 23/80
USPC .................................................. 502/343, 345
See application file for complete search history.

(56) References Cited

FOREIGN PATENT DOCUMENTS

| KR | 10-0763311 | 10/2007 |
|---|---|---|
| KR | 10-2008-0011628 | 2/2008 |
| WO | WO 03/053575 | 7/2003 |
| WO | WO 2006/117190 | 11/2006 |

OTHER PUBLICATIONS

S. Fujita et al., "Methanol synthesis from $CO_2$ over Cu/ZnO catalysts prepared from various coprecipitated precursors," *Catalysis Today*, vol. 45, 1998, pp. 241-244.

(Continued)

*Primary Examiner* — Kaj K Olsen
*Assistant Examiner* — James Fiorito
(74) *Attorney, Agent, or Firm* — Goldilocks ZONE IP Law

(57) ABSTRACT

The present disclosure relates to a Cu/Zn/Al catalyst and a method for preparing same. More particularly, the present disclosure relates to a Cu/Zn/Al catalyst including copper particles having high surface area and thus having excellent activity, which is prepared by: preparing a metal precursor solution by dissolving a copper precursor, a zinc precursor and an aluminum precursor in an organic solvent; mixing an aqueous basic solution with the metal precursor solution and precipitating metal particles; and preparing a Cu/Zn/Al catalyst by collecting and sintering the precipitated metal particles, and a method for preparing same.

13 Claims, 1 Drawing Sheet

(56) References Cited

OTHER PUBLICATIONS

M. Adachi-Pagano et al., "Synthesis of Al-rich hydrotalcite-like copounds by using the urea hydrolysis reaction-control of size and morphology," *Journal of Materials Chemistry*, vol. 13, 2003, pp. 1988-1993.

M. Behrens et al., "Understanding the complexity of a catalyst synthesis: Co-precipitation of mixed Cu, Zn, Al hydroxycarbonate precursors for $Cu/ZnO/Al_2O_3$ catalysts investigated by titration experiments," *Applied Catalysis A: General*, vol. 392, 2011, pp. 93-102.

CU/ZN/AL CATALYST AND METHOD FOR PREPARING THE SAME

CROSS-REFERENCE TO RELATED APPLICATION

This application claims priority to Korean Patent Application No. 10-2012-0126757, filed on Nov. 9, 2012, and all the benefits accruing therefrom under 35 U.S.C. §119, the contents of which in its entirety are herein incorporated by reference.

BACKGROUND

1. Field

The present disclosure relates to a Cu/Zn/Al catalyst and a method for preparing same. More particularly, it relates to a Cu/Zn/Al catalyst including copper particles having high surface area, which is prepared by dissolving precursors of copper, zinc and aluminum in an aqueous-organic mixture solution and precisely controlling the temperature of the aqueous-organic mixture solution and has excellent activity, and a method for preparing same.

2. Description of the Related Art

A Cu/Zn/Al catalyst consisting of copper (Cu), zinc (Zn) and aluminum (Al) is used for methanol synthesis (C. Busetto et al. *Journal of Catalysis*, 1984, 85, 260-266.), production of hydrogen through reforming of methanol (John P. Breen and Julian R. H. Ross, *Catalysis Today*, 1999, 51, 521-533.), production of alcohol by hydrogenation of organic acid or ester (Sriram Varadarajan and Dennis J. Miller, *Biotechnology Progress*, 1999, 15, 845-854; Sung Min Kim et al. *Catalysis Communications*, 2011, 12, 1328-1332.), or the like.

These reactions are studied to produce fuel that can replace petroleum. High activity of the Cu/Zn/Al-based catalyst is a prerequisite for ensuring economic efficiency in application of the reactions to large-scale processes.

The Cu/Zn/Al catalyst is mainly prepared by co-precipitation. The reaction activity of the catalyst is proportional to the surface area of copper, which is one of the active components of the catalyst. The existing catalyst prepared by the co-precipitation method has a copper surface area of 5-20 $m^2/g$ and has a catalytic activity corresponding thereto. Accordingly, it is an important issue to increase the surface area of copper in order to enhance the activity of the catalyst.

In addition to the co-precipitation method, homogeneous precipitation was also used to synthesize the Cu/Zn/Al-based catalyst including copper particles having high surface area. In this case, a catalyst with high activity could be obtained by synthesizing copper particles of relatively small size.

The inventors of the present disclosure have improved the existing homogeneous precipitation method for improving catalytic activity. They have found out that a Cu/Zn/Al catalyst prepared by dissolving precursors of copper, zinc and aluminum in an aqueous-organic mixture solution and precisely controlling the temperature of the aqueous-organic mixture solution includes copper particles having high surface area.

REFERENCES OF THE RELATED ART

Patent Documents (Patent document 1) International Patent Publication No. WO/2003/053575

(Patent document 2) International Patent Publication No. WO/2006/117190

Non-Patent Documents (Non-patent document 1) Shin-ichiro Fujita, Yoshinori Kanamori, Agus Muhamad Satriyo, Nobutsune Takezawa, *Catalysis Today*, 1998, 45, 241-244.

(Non-patent document 2) Malte Behrens et al., *Applied Catalysis A: General*, 2011, 392, 93-102.

(Non-patent document 3) Mariko Adachi-Pagano, Calude Forano, Jean-Pierre Besse, *Journal of Materials Chemistry*, 2003, 13, 1988-1993.

SUMMARY

The present disclosure is directed to providing a Cu/Zn/Al catalyst including copper particles having high surface area and thus having excellent catalytic activity, which is prepared by dissolving precursors of copper, zinc and aluminum in an aqueous-organic mixture solution and precisely controlling the temperature of the aqueous-organic mixture solution and has excellent activity, and a method for preparing same.

In one aspect, there is provided a method for preparing a Cu/Zn/Al catalyst, including: preparing a metal precursor solution by dissolving a copper precursor, a zinc precursor and an aluminum precursor in an organic solvent; mixing an aqueous basic solution with the metal precursor solution and precipitating metal particles; and preparing a Cu/Zn/Al catalyst by collecting and sintering the precipitated metal particles.

In an exemplary embodiment, the metal precursor is a metal salt wherein the metal is bound to one or more salt selected from a group consisting of acetate, chloride and nitrate.

In an exemplary embodiment, the salt is a nitrate salt.

In an exemplary embodiment, the organic solvent is at least one selected from a group consisting of ethylene glycol, ethanol and tetrahydrofuran.

In an exemplary embodiment, when preparing the metal precursor solution, the molar concentration of the metal precursors is 0.05-0.5 M based on the total volume of the organic solvent, and the molar ratio of the copper precursor, the zinc precursor and the aluminum precursor included in the metal precursor solution is 3:3:1.

In an exemplary embodiment, the temperature of the prepared metal precursor solution is 65-75° C.

In an exemplary embodiment, the aqueous basic solution is an aqueous sodium bicarbonate solution.

In an exemplary embodiment, the molar concentration of sodium bicarbonate included in the aqueous basic solution is 0.1-0.2 M.

In an exemplary embodiment, the temperature of the aqueous basic solution is 65-70° C.

In an exemplary embodiment, when precipitating the metal particles, the aqueous basic solution is added to the metal precursor solution at a rate of 1-15 mL/min.

In an exemplary embodiment, when precipitating the metal particles, the aqueous basic solution and the metal precursor solution are mixed at a volume ratio of 1:1-1:10.

In an exemplary embodiment, when precipitating the metal particles, the mixture of the aqueous basic solution and the metal precursor solution is stirred at 65-75° C.

In an exemplary embodiment, when preparing the Cu/Zn/Al catalyst, the precipitated metal particles are collected and washed with distilled water at least 3 times, the washed metal particles are dried at 80-110° C. for 24-72 hours, and the dried metal particles are sintered at 200-500° C. for 1-10 hours.

In another aspect, there is provided a Cu/Zn/Al catalyst including copper particles having high surface area, which is prepared as described above.

In an exemplary embodiment, the Cu/Zn/Al catalyst is a Cu/Zn/Al catalyst wherein the surface area of copper particles is 30 m$^2$/g or higher based on the total surface area of the catalyst.

In an exemplary embodiment, the molar ratio of copper, zinc and aluminum is 3:3:1.

In an exemplary embodiment, the particle size of the Cu/Zn/Al catalyst is not greater than 1 μm.

In an exemplary embodiment, the Cu/Zn/Al catalyst is used as a catalyst in one or more reaction selected from a group consisting of methanol synthesis, production of hydrogen through reforming of methanol, production of alcohol by organic acid and ester, and water-gas shift reaction.

The Cu/Zn/Al catalyst including copper particles having high surface area prepared according to the present disclosure has remarkably higher copper surface area as compared to the existing Cu/Zn/Al catalyst and, therefore, has significantly improved catalytic activity. If the Cu/Zn/Al catalyst is used for production of alcohol by hydrogenation, the economic efficiency of the reaction can be improved.

BRIEF DESCRIPTION OF THE DRAWINGS

The above and other aspects, features and advantages of the disclosed exemplary embodiments will be more apparent from the following detailed description taken in conjunction with the accompanying drawings in which.

Figure 1:
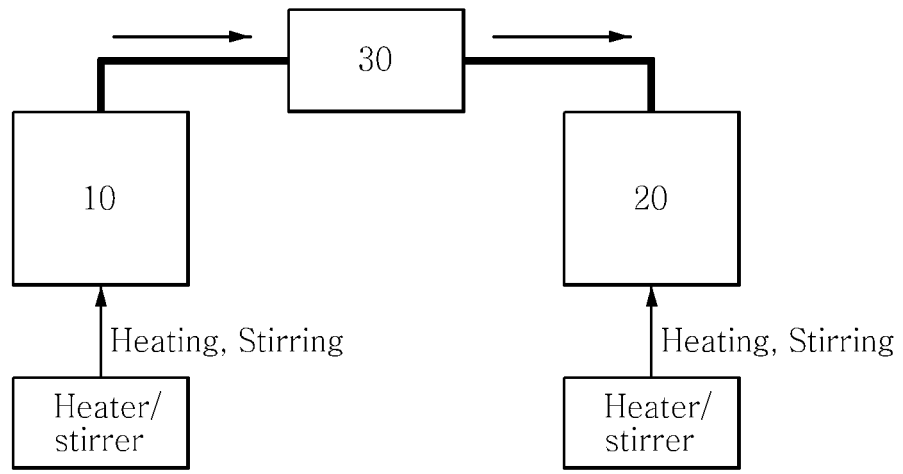
FIG. 1 schematically shows an apparatus for preparing a Cu/Zn/Al catalyst according to an exemplary embodiment of the present disclosure.
Figure 2:
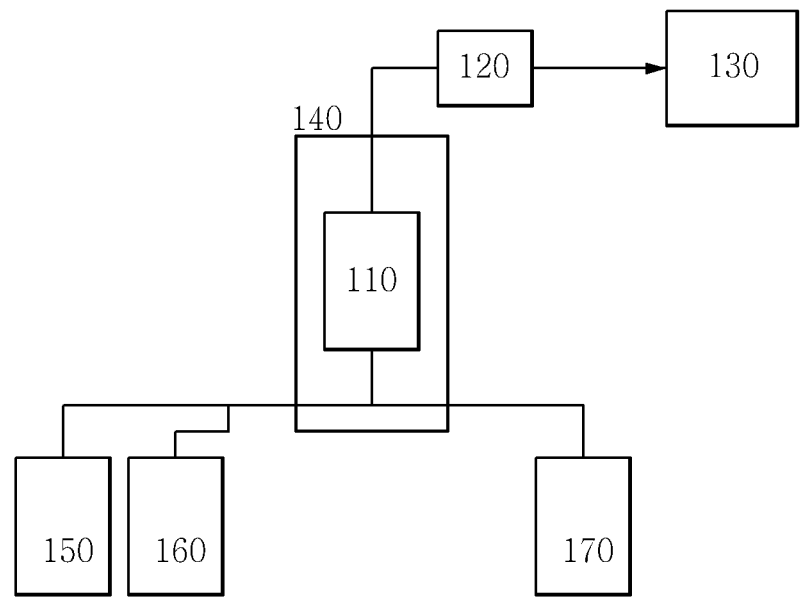
FIG. 2 schematically shows an apparatus for measuring the activity of a Cu/Zn/Al catalyst prepared according to an exemplary embodiment of the present disclosure.

| [Detailed Description of Main Elements] | |
|---|---|
| 10, 20: flask | 30: syringe pump |
| 110: reactor | 120: condenser |
| 130: gas chromatography unit | 140: heater |
| 150: nitrogen cylinder | 160: hydrogen cylinder |
| 170: butyl butyrate | |

DETAILED DESCRIPTION

Hereinafter, the present disclosure is described in detail.

In an aspect, the present disclosure provides a method for preparing a Cu/Zn/Al catalyst, including:

preparing a metal precursor solution by dissolving a copper precursor, a zinc precursor and an aluminum precursor in an organic solvent;

mixing an aqueous basic solution with the metal precursor solution and precipitating metal particles; and preparing a Cu/Zn/Al catalyst by collecting and sintering the precipitated metal particles.

First, a metal precursor solution is prepared by dissolving a copper precursor, a zinc precursor and an aluminum precursor in an organic solvent.

The copper, zinc and aluminum precursors are not particularly limited as long as they are soluble in an organic solvent. Specifically, they may be in the form of metal salts. For example, each of the copper precursor, the zinc precursor and the aluminum precursor may be a metal salt wherein each of copper, zinc and aluminum is bound to one or more salt selected from a group consisting of acetate, chloride and nitrate. In particular, when copper nitrate, zinc nitrate and aluminum nitrate are used as the precursors, the finally prepared Cu/Zn/Al catalyst has remarkably increased surface area and, therefore, the catalytic activity is maximized.

The organic solvent is not particularly limited as long as it can dissolve the copper, zinc and aluminum precursors, specifically those in the form of metal salts. For example, the organic solvent may be at least one selected from a group consisting of ethylene glycol, ethanol and tetrahydrofuran. When ethylene glycol is used as the organic solvent, the finally prepared Cu/Zn/Al catalyst has remarkably increased surface area and, therefore, the catalytic activity is maximized.

When preparing the metal precursor solution by dissolving the metal precursors in the organic solvent, the molar concentration of the metal precursors may be 0.05-0.5 M based on the total volume of the organic solvent. If the molar concentration of the metal precursors is lower than 0.05 M based on the total volume of the organic solvent, a long time may be required to prepare the metal precursor solution. And, if it exceeds 0.5 M, active surface area of the catalyst per mass may decrease because of increased size of metal particles. In particular, when the molar ratio of copper nitrate, zinc nitrate and aluminum nitrate included in the metal precursor solution is 3:3:1, the copper surface area of the finally prepared Cu/Zn/Al catalyst can be increased more easily.

The temperature of the prepared metal precursor solution may be, for example, 65-75° C. If the temperature is below 65° C., the solubility of the precursors may be low. And, if it exceeds 75° C., metal particles may not be produced.

An aqueous basic solution is prepared separately from the metal precursor solution. The aqueous basic solution is not particularly limited as long as it can precipitate metal particles by reacting with the metal precursor solution. Specifically, the aqueous basic solution may be one that, when mixed with the metal precursor solution, can maintain the resulting mixture solution weakly basic. If the mixture solution is strongly basic, it is difficult to obtain particles having high surface area because the metal particles are precipitated quickly. And, if the mixture solution is neutral or acidic, the metal particles may not be formed.

For example, the aqueous basic solution may include sodium bicarbonate as a base. The sodium bicarbonate can maintain the mixture solution of the aqueous basic solution and the metal precursor solution weakly basic (pH 7-10).

The molar concentration of the aqueous basic solution, particularly aqueous sodium bicarbonate solution, may be 0.1-0.2 M. If the molar concentration of the aqueous sodium bicarbonate solution is lower than 0.1 M, particles may not be formed because the pH of the mixture solution is close to neutral. And, if the molar concentration of the aqueous sodium bicarbonate solution exceeds 0.2 M, metal particles are precipitated quickly because the mixture solution becomes strongly basic. As a result, metal particles having high surface area cannot be prepared.

The temperature of the aqueous basic solution may be 65-70° C. If the temperature of the aqueous basic solution is below 65° C., it is difficult to prepare a catalyst having high surface area because metal particles are formed quickly. And, if the temperature exceeds 70° C., particles may not be formed.

When precipitating the metal particles, the aqueous basic solution is mixed with the prepared metal precursor solution by adding the aqueous basic solution at a constant rate. For example, the aqueous basic solution may be added at a rate of 1-15 mL/min. Within this range, a uniform mixture solution can be formed. In particular, a Cu/Zn/Al catalyst including copper having high surface area can be prepared effectively when the aqueous basic solution is added to the prepared metal precursor solution. Conversely, if the metal precursor solution is added to the aqueous basic solution, the surface area of the catalyst may decrease.

When mixing the aqueous basic solution and the metal precursor solution, the volume ratio of the solutions may be 1:1-1:10. If the mixture solution is prepared with the above-described volume ratio, a uniform mixture solution may be obtained and, thus, more uniform metal particles can be obtained.

When precipitating the metal particles, the mixture solution of the aqueous basic solution and the metal precursor solution may be stirred at, for example, 65-75° C. If the mixture solution is stirred within this temperature range, uniform metal particles having high surface area can be obtained at a proper rate. If the temperature of the mixture solution during the stirring of the mixture solution is below 65° C., the surface area of particles may decrease because the particles grow quickly. And, if the temperature exceeds 75° C., particles may not be formed.

Following the stirring, metal particles are precipitated.

Then, the precipitated metal particles are collected, and the collected metal particles are washed, dried and sintered to obtain a catalyst in powder form.

The method for collecting the metal particles is not particularly limited. For example, they may be collected by vacuum filtration using a vacuum filter.

The method for washing the collected metal particles is not particularly limited. For example, distilled water may be used. Specifically, the collected metal particles may be sufficiently washed with distilled water at least 3 times to remove impurities.

The method for drying the washed metal particles in the air is not particularly limited. For example, if the metal particles are dried at around 100° C. for 24-72 hours, the surface area of the metal particles in the prepared catalyst can be increased remarkably.

The method for sintering the dried metal particles is not particularly limited. For example, the metal particles may be sintered in the air at 200-500° C. for 1-10 hours. When the metal particles are sintered in the above temperature range, metal particles having high surface area can be formed easily. If the sintering is carried out at temperatures above 500° C., it is difficult to form metal particles having high surface area because the particle size increases excessively.

The final product, i.e. a Cu/Zn/Al catalyst, obtained after the sintering has remarkably high surface area of copper as compared to the existing Cu/Zn/Al catalyst since the active component copper is formed as particles. Accordingly, the finally prepared catalyst exhibits improved activity.

In another aspect, the present disclosure provides a Cu/Zn/Al catalyst including copper, zinc and aluminum, wherein the surface area of copper particles is 30 $m^2/g$ or higher, more specifically 40 $m^2/g$ or 45 $m^2/g$ or higher, based on the total surface area of the catalyst. The molar ratio of copper, zinc and aluminum may be, for example, 3:3:1, and the catalyst may have a particle size of not greater than 1 μm, more specifically not greater than 500 nm. Each of the copper, zinc and aluminum particles may have a particle size of nanometer scale, for example, not greater than 100 nm, more specifically not greater than 50 nm. The activity of the catalyst is related with the surface area of copper. Since the copper particles included in the catalyst according to the present disclosure have about 2-10 times increased surface area as compared to the existing catalyst, the catalyst according to the present disclosure exhibits very superior catalytic activity. The catalyst may be used, for example, in methanol synthesis, production of hydrogen through reforming of methanol, production of alcohol by organic acid and ester, water-gas shift reaction, etc. and may remarkably improve the efficiency of the reactions.

EXAMPLES

Hereinafter, the present disclosure will be described in detail through examples. However, the following examples are for illustrative purposes only and it will be apparent to those of ordinary skill in the art that the scope of the present disclosure is not limited by the examples.

Example 1

A process for preparing a Cu/Zn/Al-based catalyst according to an exemplary embodiment of the present disclosure is described as follows.

First, an aqueous 1.2 M sodium bicarbonate ($NaHCO_3$) solution (60 mL) is prepared as an aqueous basic solution in a flask A 10 and heated to about 68° C. Then, 241.6 g (0.008571 mol) of copper nitrate ($CuNO_3$), 297.49 g (0.008571 mol) of zinc nitrate ($Zn(NO_3)_2$) and 375.13 g (0.002857 mol) of aluminum nitrate ($Al(NO_3)_3$) as metal precursors are dissolved in 240 mL of ethylene glycol ($HOCH_2CH_2OH$) as an organic solvent in a flask B 20 (molar ratio of copper nitrate, zinc nitrate and aluminum nitrate=3:3:1). The flask B is stirred while heating at about 69° C. The solution in the flask A is slowly added to the flask B for about 13 minutes at a rate of 8 mL/min using a syringe pump 30. After the mixing is finished, the solution in the flask B is stirred for 2 hours while heating at about 70° C. Subsequently, the precipitate formed in the flask B is collected by vacuum filtration using a vacuum filter and washed 3 times with 300 mL of triply distilled water. The washed precipitate is dried in the air at 105° C. for 48 hours. Thus obtained powder is sintered in the air at 350° C. for 3 hours to obtain the final product.

Comparative Example 1

A process for preparing a Cu/Zn/Al-based catalyst of Comparative Example 1 is described as follows. Description of the same contents described in Example 1 will be omitted.

In Comparative Example 1, a Cu/Zn/Al-based catalyst is prepared in the same manner as in Example 1, except for adding the metal precursor mixture solution dissolved in ethylene glycol to the aqueous 1.2 M sodium bicarbonate solution.

Example 1 and Comparative Example 1 are compared in Table 1.

TABLE 1

|  | Cu:Zn:Al molar ratio | Surface area of copper ($m^2/g$) |
| --- | --- | --- |
| Example 1 | 3:3:1 | 45.5 |
| Comparative Example 1 | 3:3:1 | 37.9 |

As seen from Table 1, the Cu/Zn/Al catalyst prepared in Example 1 exhibits remarkably higher copper surface area of 45.5 $m^2/g$ than the copper surface area (37.9 $m^2/g$) of the Cu/Zn/Al catalyst prepared in Comparative Example 1.

That is to say, a Cu/Zn/Al catalyst including copper having a larger surface area can be prepared when the aqueous sodium bicarbonate (NaHCO$_3$) solution is added to the metal precursor mixture solution dissolved in ethylene glycol (Example 1) as compared to when the metal precursor mixture solution dissolved in ethylene glycol is added to the aqueous sodium bicarbonate (NaHCO$_3$) solution (Comparative Example 1).

Examples 2-1 to 2-5

A process for preparing a Cu/Zn/Al-based catalyst according to another embodiment of the present disclosure is described as follows. Description of the same contents described in Example 1 will be omitted.

In Examples 2-1 to 2-5, a Cu/Zn/Al-based catalyst is prepared in the same manner as in Example 1, except for changing the molar ratio of copper nitrate, zinc nitrate and aluminum nitrate to 2:4:1 (Example 2-1), 2.5:3.5:1 (Example 2-2), 3.5:2.5:1 (Example 2-3), 4:2:1 (Example 2-4) or 5:1:1 (Example 2-5) when preparing the metal precursor solution.

TABLE 2

| | Cu:Zn:Al molar ratio | Surface area of copper (m$^2$/g) |
|---|---|---|
| Example 1 | 3:3:1 | 45.5 |
| Example 2-1 | 2:4:1 | 21.8 |
| Example 2-2 | 2.5:3.5:1 | 17.9 |
| Example 2-3 | 3.5:2.5:1 | 23.6 |
| Example 2-4 | 4:2:1 | 17.2 |
| Example 2-5 | 5:1:1 | 27.1 |

As seen from Table 2, the surface area of copper in the finally prepared Cu/Zn/Al catalyst is the highest when the molar ratio of copper nitrate, zinc nitrate and aluminum nitrate is 3:3:1 (Example 1).

Examples 3-1 to 3-4

Next, a process for preparing a Cu/Zn/Al-based catalyst according to another embodiment of the present disclosure is described as follows. Description of the same contents described in Example 1 will be omitted.

In Examples 3-1 to 3-4, a Cu/Zn/Al-based catalyst is prepared in the same manner as in Example 1, except for changing the temperatures of the aqueous basic solution (flask A) and the mixture solution of the aqueous basic solution and the metal precursor solution (flask B) as follows: Example 3-1 (flask A: 70° C., flask B: 70° C.), Example 3-2 (flask A: 69° C., flask B: 70° C.), Example 3-3 (flask A: 66.5° C., flask B: 70° C.), Example 3-4 (flask A: 68° C., flask B: 72° C.).

TABLE 3

| | Cu:Zn:Al molar ratio | Temperature of flask A (° C.) | Temperature of flask B (° C.) | Surface area of copper (m$^2$/g) |
|---|---|---|---|---|
| Example 1 | 3:3:1 | 68 | 70 | 45.5 |
| Example 3-1 | 3:3:1 | 70 | 70 | 33.5 |
| Example 3-2 | 3:3:1 | 69 | 70 | 34.7 |
| Example 3-3 | 3:3:1 | 66.5 | 70 | 35.9 |
| Example 3-4 | 3:3:1 | 68 | 72 | 36.4 |

As seen from Table 3, the surface area of copper in the prepared Cu/Zn/Al catalyst is the highest when the temperature of the aqueous basic solution is maintained at 68° C. and the temperature of the mixture solution of the aqueous basic solution and the metal precursor solution is maintained at 70° C. (Example 1).

Examples 4-1 to 4-3

Next, a process for preparing a Cu/Zn/Al-based catalyst according to another embodiment of the present disclosure is described as follows. Description of the same contents described in Example 1 will be omitted.

In Examples 4-1 to 4-3, a Cu/Zn/Al-based catalyst is prepared in the same manner as in Example 1, except for changing the organic solvent for dissolving the metal precursors to ethanol (Example 4-1), tetrahydrofuran (Example 4-2), 1,2-dioxane (Example 4-3).

TABLE 4

| | Cu:Zn:Al molar ratio | Solvent | Surface area of copper (m$^2$/g) |
|---|---|---|---|
| Example 1 | 3:3:1 | Ethylene glycol | 45.5 |
| Example 4-1 | 3:3:1 | Ethanol | 23.5 |
| Example 4-2 | 3:3:1 | Tetrahydrofuran | 18.1 |
| Example 4-3 | 3:3:1 | 1,2-Dioxane | 3.9 |

As seen from Table 4, the surface area of copper in the prepared catalyst is the highest when the metal precursors dissolved in ethylene glycol (Example 1).

Measurement of Catalytic Activity Depending on Surface Area of Copper in Cu/Zn/Al Catalyst In order to confirm the catalytic activity of the catalyst according to the present disclosure, conversion of butyl butyrate to n-butanol was performed using the Cu/Zn/Al catalysts prepared in Example 1 and Comparative Example 1.

The copper surface area of the catalyst prepared in Example 1 is 45.5 m$^2$/g and the copper surface area of the catalyst prepared in Comparative Example 1 is 37.9 m$^2$/g.

0.5 g of the two catalysts were filled respectively inside two continuous reactors 110, and butyl butyrate 170 and hydrogen gas 160 were supplied to the reactor 110 at a rate of 1.17 g/hour and 0.33 g/hour, respectively. The pressure inside the reactor was maintained at 10 bar. Reactor temperature was maintained at 200° C. or 230° C. The reaction product produced in the continuous reactor was collected as liquid by a condenser 120 and analyzed using a gas chromatography unit 130 to measure the butyl butyrate conversion rate and to compare the reaction activity of the catalysts. The result is as follows.

TABLE 5

| | Butyl butyrate conversion rate at 200° C. | Butyl butyrate conversion rate at 230° C. |
|---|---|---|
| Example 1 (Cu:Zn:Al molar ratio = 3:3:1) | 66.4% | 92.2% |
| Comparative Example 1 (Cu:Zn:Al molar ratio = 3:3:1) | 41.4% | 34.1% |

As seen from Table 5, the butyl butyrate-to-butanol conversion rate was higher in Example 1 wherein the Cu/Zn/Al catalyst has a higher surface area of copper. Accordingly, it can be seen that the catalytic activity increases as the copper surface area of the prepared catalyst is larger.

What is claimed is:

1. A method for preparing a Cu/Zn/Al catalyst, comprising:
   preparing a metal precursor solution by dissolving a copper precursor, a zinc precursor and an aluminum precursor in an organic solvent;
   mixing an aqueous basic solution with the metal precursor solution and precipitating metal particles; and
   preparing a Cu/Zn/Al catalyst by collecting and sintering the precipitated metal particles.

2. The method for preparing a Cu/Zn/Al catalyst according to claim 1, wherein the metal precursor is a metal salt wherein a metal is bound to one or more salt selected from a group consisting of acetate, chloride and nitrate.

3. The method for preparing a Cu/Zn/Al catalyst according to claim 2, wherein the salt is nitrate.

4. The method for preparing a Cu/Zn/Al catalyst according to claim 1, wherein the organic solvent is at least one selected from a group consisting of ethylene glycol, ethanol and tetrahydrofuran.

5. The method for preparing a Cu/Zn/Al catalyst according to claim 1, wherein, in said preparing the metal precursor solution, the molar concentration of the metal precursors is 0.05-0.5 M based on the total volume of the organic solvent, and the molar ratio of the copper precursor, the zinc precursor and the aluminum precursor included in the metal precursor solution is 3:3:1.

6. The method for preparing a Cu/Zn/Al catalyst according to claim 1, wherein the temperature of the prepared metal precursor solution is 65-75° C.

7. The method for preparing a Cu/Zn/Al catalyst according to claim 1, wherein the aqueous basic solution is an aqueous sodium bicarbonate solution.

8. The method for preparing a Cu/Zn/Al catalyst according to claim 7, wherein the molar concentration of sodium bicarbonate included in the aqueous basic solution is 0.1-0.2 M.

9. The method for preparing a Cu/Zn/Al catalyst according to claim 1, wherein the temperature of the aqueous basic solution is 65-70° C.

10. The method for preparing a Cu/Zn/Al catalyst according to claim 1, wherein, in said precipitating the metal particles, the aqueous basic solution is added to the metal precursor solution at a rate of 1-15 mL/min.

11. The method for preparing a Cu/Zn/Al catalyst according to claim 1, wherein in said precipitating the metal particles, the aqueous basic solution and the metal precursor solution are mixed at a volume ratio of 1:1-1:10.

12. The method for preparing a Cu/Zn/Al catalyst according to claim 1, wherein, in said precipitating the metal particles, the mixture of the aqueous basic solution and the metal precursor solution is stirred at 65-75° C.

13. The method for preparing a Cu/Zn/Al catalyst according to claim 1, wherein, in said preparing the Cu/Zn/Al catalyst, the precipitated metal particles are collected and washed with distilled water at least 3 times, the washed metal particles are dried at 80-110° C. for 24-72 hours, and the dried metal particles are sintered at 200-500° C. for 1-10 hours.

* * * * *